United States Patent [19]

Inazawa et al.

[11] Patent Number: 4,821,128
[45] Date of Patent: Apr. 11, 1989

[54] APPARATUS FOR RECORDING AND/OR REPRODUCING A CONTROL SIGNAL

[75] Inventors: Yoshizumi Inazawa, Kanagawa; Hisashi Asano, Tokyo, both of Japan

[73] Assignee: Sony Corporation, Japan

[21] Appl. No.: 62,867

[22] Filed: Jun. 15, 1987

[30] Foreign Application Priority Data

Jun. 17, 1986 [JP] Japan .................. 61-141139
Jun. 18, 1986 [JP] Japan .................. 61-142242

[51] Int. Cl.$^4$ .................................. G11B 27/28
[52] U.S. Cl. .................................. 360/72.2
[58] Field of Search ..................... 360/72.2, 74.4

[56] References Cited

U.S. PATENT DOCUMENTS 4,541,022 9/1985 Katsuyama .................. 360/72.2
4,635,144 1/1987 Goto et al. .................. 360/74.4 X
4,641,208 2/1987 Inazawa et al. .................. 360/72.2
4,688,116 8/1987 Takahashi et al. .................. 360/72.2

FOREIGN PATENT DOCUMENTS

2155683 9/1985 United Kingdom .

Primary Examiner—John H. Wolff
Attorney, Agent, or Firm—Limbach, Limbach & Sutton

[57] ABSTRACT

An apparatus for recording and/or reproducing a control signal in which a start point from which a control signal such as a program start identifying signal is recorded in a sub-code area is set by the use of an address signal written in a PCM area so that the positional information of a recording medium can be exactly detected and thereby it is assured that the control signal can be recorded in a desired position.

8 Claims, 7 Drawing Sheets

| W1 | | | W2 | |
|---|---|---|---|---|
| Subcode ID | | | Subcode ID | Block Address |
| Control ID | Data ID | 1 | Format ID | X X X 0 |
| PNO-2 | PNO-3 | 1 | PNO-1 | X X X 1 |

| W1 (PCM-ID) | | | W2 (Block Address) |
|---|---|---|---|
| ID-1 | ID-2 | Frame Address | 0 X X X 0 0 0 |
| Optional Code | | | 0 X X X X 0 0 1 |
| ID-3 | ID-4 | Frame Address | 0 X X X X 0 1 0 |
| Optional Code | | | 0 X X X X 0 1 1 |
| ID-5 | ID-6 | Frame Address | 0 X X X X 1 0 0 |
| Optional Code | | | 0 X X X X 1 0 1 |
| ID-7 | ID-8 | Frame Address | 0 X X X X 1 1 0 |
| Optional Code | | | 0 X X X X 1 1 1 |

APPARATUS FOR RECORDING AND/OR REPRODUCING A CONTROL SIGNAL

BACKGROUND OF THE INVENTION

1. Field of the Invention

This invention relates generally to an apparatus for recording and/or reproducing a control signal, and more particularly to an apparatus of this kind which is capable of exactly recording a control signal in a specific area of a recording medium.

2. Description of the Prior Art

There is known a digital audio tape recorder (R-DAT) which uses a rotary head for recording an audio signal on a tape as a PCM signal. When an audio signal or other information is recorded by such a digital audio tape recorder, recorded on the medium is not only the PCM-coded audio signal but also a sub-code which includes positional information, such as a program number, a time code and so on and other required auxiliary data, e.g., a program start identifying signal, a skip identifying signal and so on. It is therefore possible to know, on the basis of the sub-code, a tape position and detect the start point of a program in a search mode when the signal is reproduced.

The assignee of the present invention has proposed a method of recording a program start identifying signal in U.S. Pat. No. 4,641,208. According to this method, a program start identifying signal "1" is recorded only in a leading portion of a program. At the middle part of the program, the program, the program start identifying signal "0" is recorded. In the first recording, a program number is sequentially recorded in a predetermined location of the sub-code area of each program. However, in the second recording or afterward, a program start identifying signal is recorded in place of the program number in the above predetermined location for a time period required for detection, e.g. for 9 seconds. When program numbers are recorded on a tape which has all programs recorded thereon, the program start identifying signals are sequentially detected in the respective programs, and a program number following the last one designated in the first recording is sequentially recorded in the same portion in which the program start identifying signal is recorded for the respective programs.

According to the above-mentioned recording method, when the program start identifying signal is recorded, if a desired position at which the program start identifying signal is desired to be recorded arrives, it is recorded by depressing a particular button assigned for this operation. However, due to a delay in the response of the operator and so on, there may occur the problem that the program start identifying signal is recorded at a position slightly deviated from the desired position, thereby causing the top portion of a program to be cut, for example, upon the search operation.

To attend to the above-mentioned defect, the assignee of the present invention has proposed a recording and/or reproducing apparatus which can always record a control signal, such as the program start identifying signal, exactly at a desired position by repeatedly reproducing the control signal.

A skip identifying signal is a control signal which is recorded in the sub-code portion. This skip identifying signal is usually "0", but skip identifying signal "1" is recorded for approximately 1 second in a head portion of a specific unnecessary information portion which is desired to be skipped upon reproducing a program. A method of recording the skip identifying signal is disclosed in U.S. patent application Ser. No. 858,023, filed on May 29, 1985.

Among these control signals, the program start identifying signal "1" and the skip identifying signal "1" are recorded respectively for 9 seconds and 1 second. However, when these signals are erased, they are erased in such a manner that the recorded position in which the identifying signals are set at "1" is first searched and then a signal "0" is written over that position.

It is necessary to know the tape positional information when a tape is repeatedly reproduced to record the control signals and erase the identifying signal, as described above.

There are methods of detecting the tape positional information as follows:

(1) Providing on a reel base a frequency generator (FG), the rotational information of which is used to obtain the tape positional information;

(2) Recording a time code in an optional portion of PCM-ID; and (3) Recording an identifying (ID) signal in a data portion of the sub-code area.

However, the method (1) is not exact because it is not easily analyzable, the method (2), because it is against the format rule, can be applied only to special tapes, and the method (3) has the possibility that a portion of the identifying signal can remain unerased.

OBJECTS AND SUMMARY OF THE INVENTION

Accordingly, it is an object of the present invention to provide an improved apparatus for recording and/or reproducing a control signal.

It is another object of the present invention to provide an apparatus for recording and/or reproducing a control signal which can selectively record a control signal exactly in a desired position on a recording medium and erase the control signal recorded on the medium.

According to one aspect of the present invention, there is provided an apparatus for recording and/or reproducing a control signal which comprises: a recording medium, in which a main signal and an address are recorded in a main signal area on the medium and a control signal with respect to the main signal is recorded in a sub-signal area on the medium; means for reproducing the address recorded in the main signal area; and re-recording means for again recording the control signal in accordance with the reproduced address.

These and other objects, feature and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENTS

There is known a digital tape recorder which uses a rotary head for recording an audio signal as a PCM signal on a tape, that is, a so-called R-DAT.

The R-DAT is constructed such that a tape is wrapped around the circumferential surface of a small rotary drum of about 30 mm in diameter with a tape-wrap angle of 90° and two rotary heads, arranged on the rotary head drum in a manner that the heads are spaced 180° apart, having a different azimuth from each other, are rotated e.g. at 2000 rpm, whereby the two rotary heads alternate in discontinuously scanning the tape by the portion corresponding to the tapewrap angle of 90°.

An audio signal is sampled by a sampling frequency of, for example, 48 KHz, and each of the sampled values is coded in 16 bits to generate a PCM audio signal. The PCM coded signal has the time base compressed into a portion corresponding to the tapewrap angle of 90° and is recorded in each of tracks oblique to the longitudinal direction of the tape at every half-revolution period of the rotary heads.

When the PCM coded signal is reproduced by the two rotary heads, the PCM coded signal is decoded and has the compressed time base extended to the original time base to thereby reproduce the original analog audio signal.

In each of the tracks obliquely formed on the tape, there is recorded not only PCM data but also a signal for a tracking servo used in the reproducing operation and sub-codes such as a time code, a program number superimposed on a head portion of music and so on in an area different from the PCM data recording area.

Figure 1:
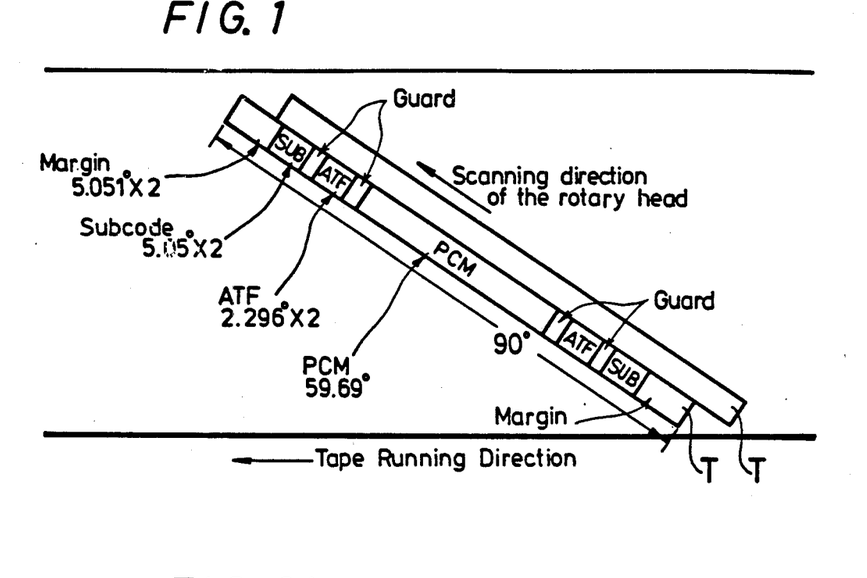
FIG. 1 is a diagram showing an example of a tape format used in a rotary head type apparatus for recording and/or reproducing a PCM audio signal.

FIG. 1 shows a tape format of the R-DAT. A PCM audio signal is recorded in an area PCM allocated in a central range of slightly less than 60° of each track T with an angular range of 90°. In two areas ATFs (in a range of approximately 2.3°) respectively allocated at both sides of the area PCM there is recorded a pilot signal for the tracking servo. In two areas SUBs (in a range of approximately 5°) respectively allocated at the outer sides of the respective areas ATFs there is recorded a sub-code.

As described above, the reason why there are provided respectively the pilot signal areas ATFs and the sub-code areas SUBs at the outer side or upper and lower portions of each track T is to cope with dropout as well as to detect or pick up the sub-codes even in a high speed search operation.

Further, there are arranged guard areas GUARD in every interval between the areas PCM and ATF and the areas PCM and SUB. Head and end portions of each track T are respectively allocated as a margin area.

A sub-code block comprising 8 blocks is written into each sub-code area SUB. The same sub-code contents are written into two sub-code areas SUBs contained in the same track T.

Figure 2A:
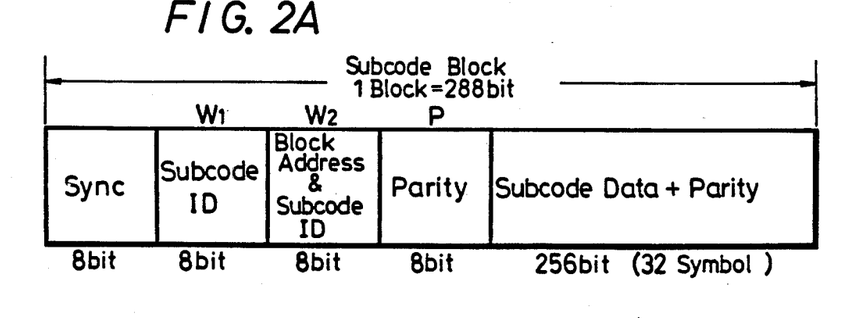
FIG. 2A is a diagram showing a construction of the format of data recorded in a sub-code area of a recording track.

FIG. 2A shows a format of the sub-code block, one block of which is formed of 288 bits in the same manner as a PCM data block.

As shown in FIG. 2A, the first 8 bits of one block are designated as a block synchronizing signal, the next 8-bits of data $W^1$ as a sub-code identifying signal (sub-code ID), the next 8-bits of data $W^2$ as a sub-code ID and an address signal of the block, the next 8-bits as an error correcting parity P generated for the data $W^1$ and $W^2$, and the remaining 256 bits (divided into 32 symbols, each of which is formed of 8 bits) as a sub-code data and an error correcting parity generated for the sub-code data.

Figure 2B:
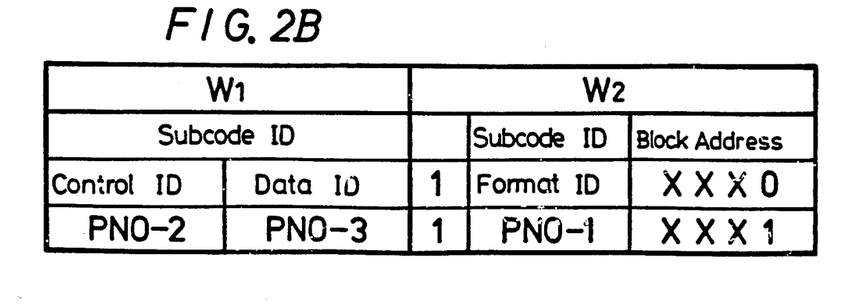
FIG. 2B is a table showing data recorded in the sub-code area.

FIG. 2B shows the contents of the data $W^1$ and $W^2$ more specifically. The most significant bit (MSB) of the data $W^1$ is used to identify whether the block is a sub-code block or a PCM data block. When the data block is a sub-code block, the MSB of the data $W^1$ is set at "1". The lower 4 bits of the data $W^2$ indicate a block address, the less significant bit (LSB) of which is set at "1" or "0" according to the contents of the sub-code ID. If the LSB of the block address is set at "0", the data W1 has a 4-bit control ID and a 4-bit data ID. The rest or upper 3 bits of the block address of the data $W^2$ are designated as a format ID.

When the LSB of the block address is set at "1", the upper 3 bits of the data $W^1$ and $W^2$ express a program number in 3 figures, wherein the upper 3 bits PNO-1 of the data $W^2$ indicate the left-most figure, the upper 4 bits PNO-2 of the data $W^1$ indicate the medium figure, and the lower 4 bits PNO-3 of the data $W^1$ indicate the right-most figure. Therefore, the program number ranges from [001] to [799]. Incidentally, [000] indicates that a non-program number is recorded, and [0AA] indicates that a program number is invalid.

There are 4 sub-code blocks which have the LSB of the block address set at "0" and another 4 sub-code blocks which have the LSB of the block address set at "1", alternately recorded in 8 blocks of each sub-code area.

The control ID, which is formed e.g. of a 4-bit (4 kinds) identifying signal (ID), comprises a table of contents identifying signal (TOC-ID) for indicating a table of contents, a skip identifying signal (SKIP-ID) for skipping an unnecessary information portion, a program start identifying signal (START-ID) for indicating the start of a program and a priority identifying signal (PRIORITY-ID) for indicating priority information. With regard to an unnecessary information portion to be skipped, the skip identifying signal SKIP-ID becomes "1" in a one second starting portion and "0" in the rest of the unnecessary information portion. The program start identifying signal START-ID becomes "1" in a nine second starting portion of a program and "0" in the rest of the program.

Figure 3:
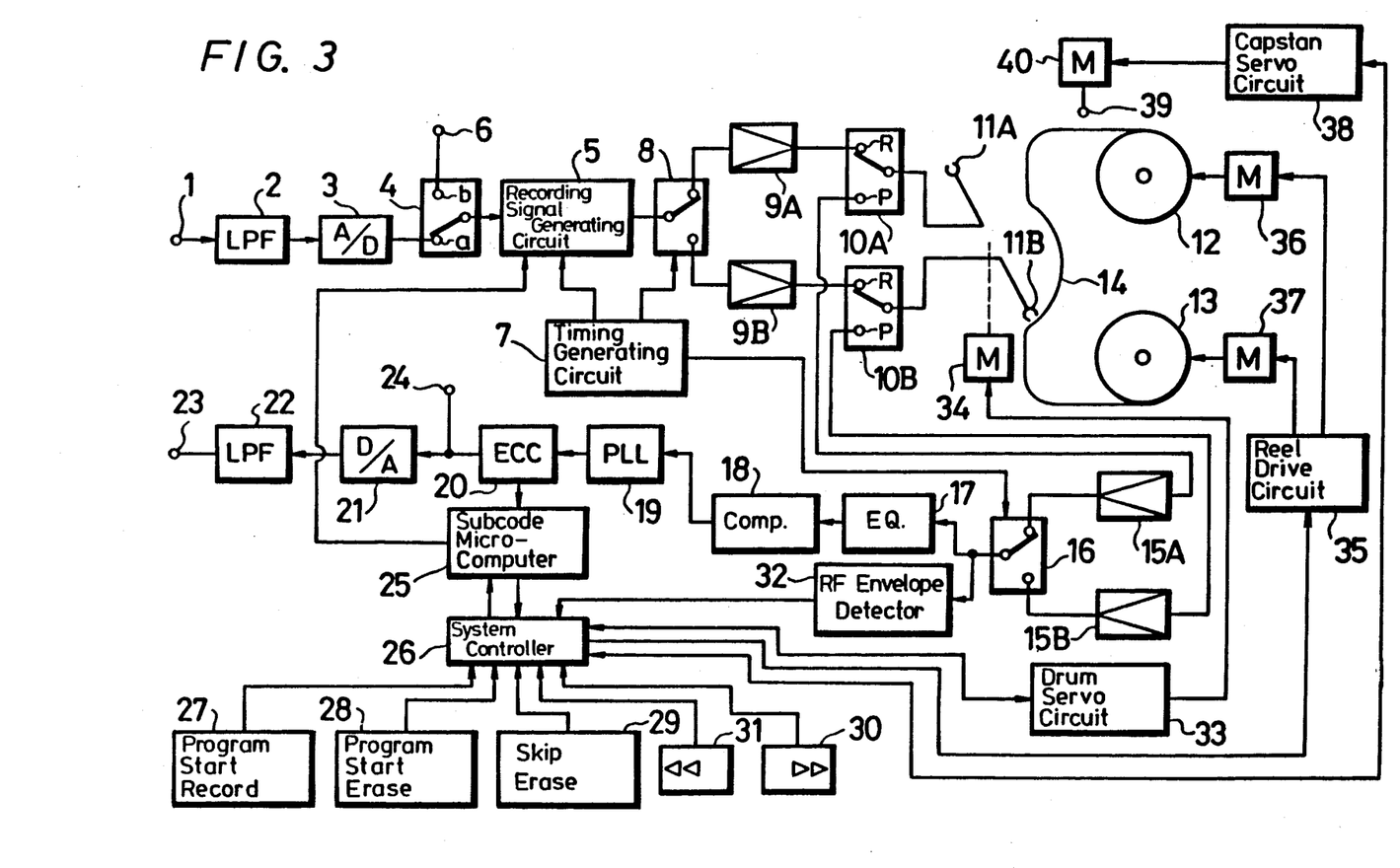
FIG. 3 is a circuit block diagram showing an embodiment of the present invention.

FIG. 3 shows a circuit configuration of an embodiment of the present invention. An analog signal delivered to an input terminal 1 is supplied through a low-pass filter 2 to an analog-to-digital (A/D) converter 3 in which the analog signal is converted into a digital signal. The digital signal from the A/D converter 3 is supplied through a fixed contact a of a switching circuit 4 to a recording signal generating circuit 5. If the switching circuit 4 is changed over to its other fixed contact b, a digital signal supplied from an external source (not shown) to a terminal 6 may be directly supplied to the recording signal generating circuit 5.

The recording signal generating circuit 5 carries out, on the basis of a timing signal from a timing signal generating circuit 7, suitable signal processing, such as the addition of an error correcting code for the data, the interleaving or modulation of the data and so on. The resulting processed signal is supplied from the recording signal generating circuit 5 to a switching circuit 8. The switching circuit 8 is used to switch between two rotary magnetic heads 11A and 11B in accordance with a switching signal from the timing signal generating circuit 7.

The switching circuit 8 is alternately switched by the switching signal between a half-revolution period including a tape contact period of the rotary head 11A and a half-revolution period including a tape contact period of the rotary head 11B. The timing signal generating circuit 7 is supplied with a pulse having a frequency of 30 Hz indicative of the rotary phases of the rotary heads 11A and 11B and which is generated from a pulse generator, not shown, in synchronism with the rotation of a motor which rotates the rotary heads 11A and 11B. The signal from the switching circuit 8 which is changed over by the switching signal from the timing signal generating circuit 7 is amplified by an amplifier 9A or 9B, then supplied through contacts R of a switching circuit 10A or 10B to the rotary head 11A or 11B, respectively, and thereby recorded on a magnetic tape 14 running between reels 12 and 13. The switching circuits 10A and 10B are switched to their contacts R in the recording mode and to their contacts P in the reproducing mode.

Reference numerals 15A and 15B designate amplifiers which are connected to receive and amplify reproduced outputs alternately supplied from the rotary heads 11A and 11B when the switching circuits 10A and 10B are switched to their respective contacts P in the playback mode. The output signals from the respective amplifiers 15A and 15B are supplied to fixed contacts of a switching circuit 16. In response to a switching signal having a frequency of 30 Hz which is supplied from the timing signal generating circuit 7, the switching circuit 16 is alternately changed over, similar to the action of the switching circuit 8 in the recording mode, between the half-revolution period including the tape contact period of the rotary head 11A and the half-revolution period including the tape contact period of the rotary head 11B.

The output signal from the switching circuit 16 is supplied through an electromagnetic transducer system formed of an equalizer 17, a comparator 18 and a PLL circuit 19 to an error correcting circuit 20 in which error correction is carried out, if necessary. The resulting signal from the error correcting circuit 20 is supplied to a digital-to-analog (D/A) converter 21 in which the reproduced digital signal is converted into an analog signal. The resulting analog signal from the D/A converter 21 is supplied through a low pass filter 22 to an output terminal 23 at which the reproduced analog signal is derived as the original analog signal.

When it is desired that the digital data is to be directly obtained, it can be derived from a terminal 24 connected to the output side of the error correcting circuit 20.

A sub-code microcomputer 25, serving as an interface, is provided at the output side of the error correcting circuit 20. The sub-code microcomputer 25 is used to extract the sub-code containing the program number, time code and so on. The extracted data is then supplied to a system controller 26 which employs a microcomputer and controls all of the system.

The system controller 26 is provided with a plurality of push buttons necessary for selecting the desired mode of operation. In FIG. 3, only a program start identifying signal recording button 27, a program start identifying signal erasing button 28, a skip identifying signal erasing button 29, a fast forward button 30 and a rewinding button 31 are illustrated as being typical of such push buttons. The fast forward button 30 and the rewinding button 31 are also used as correction buttons to correct a positional deviation when the program start identifying signal is recorded, as will be later referred to. The buttons 27, 30 and 31 are respectively provided with a display which flashes when the program start identifying signal is recorded, so as to attract the attention of the operator.

Reference numeral 33 designates a drum servo circuit which is controlled by the system controller 26. This drum servo circuit 33 is used to control a drum motor 34 for rotating a tape guide drum (not shown) on which the rotary heads 11A and 11B are mounted. A reel driving circuit 35 provides reel drive signals to reel motors 36 and 37 for rotating the reels 12 and 13, respectively. In response to a mode switching signal supplied from the system controller 26 to the reel driving circuit 35, the reel driving circuit 35 changes the level of the drive signals supplied therefrom to the reel motors 33 and 34 for controlling their operations.

Reference numeral 38 designates a capstan servo circuit which is also controlled by the system controller 26 and used to control a capstan motor 40 which drives a capstan 39. For the capstan 39 there are provided a pinch roller and a plunger circuit (not shown) which controls the pinch roller against elasticity.

Reference numeral 32 designates an RF envelope detecting circuit arranged at the output side of the switching circuit 16 for detecting an envelope of an RF signal. The output signal from the RF envelope detecting circuit 32 is supplied to the system controller 26.

If the quantity of total data recorded in one track shown in FIG. 1, which is referred to as one segment, is determined as one unit block, one segment comprises 196 blocks (7500 $\mu$sec) of data. At both ends of one segment, which are positioned at upper and lower end portions of the track, there are respectively located margins having 11 blocks. Sub-codes 1 and 2 are recorded in areas adjacent to the respective margins. These two sub-codes contain the same data, that is, the sub-codes are double recorded. The sub-codes comprise, as shown in FIGS. 2A and 2B, a program number (PNO-1, PNO-2, PNO-3), a time code (recorded in the sub-code data area shown in FIG. 2A), a program start identifying signal, a skip identifying signal (recorded in the third and second bit of the Control ID in FIG. 2B) and so on. A run-in area of PLL (2 blocks) and a postamble area (1 block) are provided at the both sides of 8-block sub-code.

There is further provided an inter-block gap of 3 blocks in which no data is recorded. A pilot signal for automatic track following (ATF) operation is recorded in a portion of 5 blocks located between the two inter-block gaps of 3 blocks. A PCM signal, suitably processed for recording, is recorded in a central area having 128 blocks in one segment of 130 blocks except for a PLL run-in area of 2 blocks. The PCM signal recorded in this area has a data length corresponding to a half-revolution period of the rotary head 11A or 11B.

Figure 4:
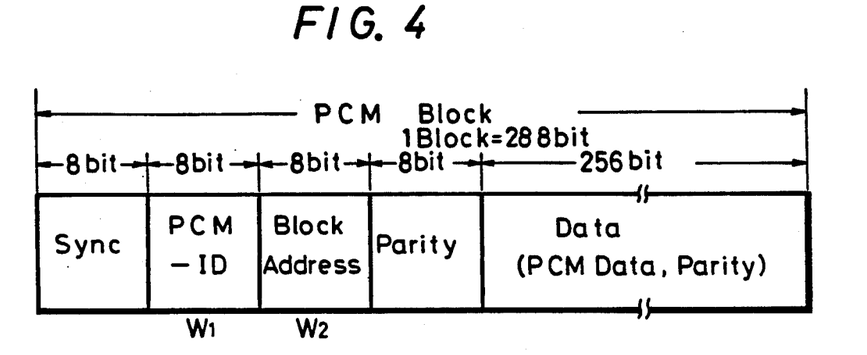
FIGS. 4 and 5 are diagrams showing a construction of data used in the present invention.
Figure 5:
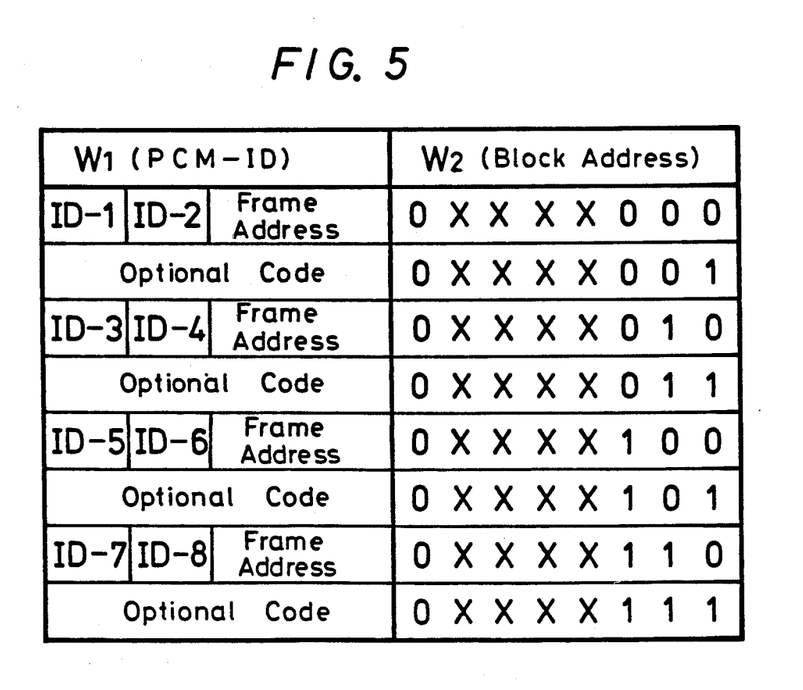

FIG. 4 shows the data construction of one block of the PCM signal. From the head of one block, an 8-bit (1 symbol) synchronizing signal, an 8-bit PCM-ID and a block address are located in this order. Then, a simple parity error correction coding is carried out for two symbols $W^1$ and $W^2$ of the PCM-ID and the block address and an 8-bit parity block is located in a portion behind the block address. The block address, as shown in FIG. 5, is formed of 7 bits except for the most significant bit (MSB). The MSB of the block address is assigned "0" in each PCM block. It is therefore possible to identify the PCM block by checking the MSB of the block address.

The 7-bit block address sequentially changes from (00) to (7F) in hexadecimal. The PCM-ID is recorded in each block, the lower 3 bits of the block address of which are (000), (010), (100) or (110). An optional code of the PCM-ID can be recorded in each block, the lower 3 bits of the block address of which is (001), (011), (101) or (111). The PCM-ID includes ID1–ID8 of 2 bits and a frame address of 4 bits. Each of ID1–ID7 designates identifying information. A pack is formed of 32 ID8s (i.e. ID8 shown in FIG. 5 is formed of 2 bits; 32×ID8 (=64 bits) is formed in a pack or packet). For example, ID1 designates a format ID which indicates whether the recorded PCM signal is for audio or for other purposes. ID2 is used to indicate on/off of preemphasis and the characteristic of the preemphasis. ID3 is used to indicate a sampling frequency. The above-mentioned ID1–ID7 in frame address are two segments forming an interleave pair and are the same data.

Figure 6:
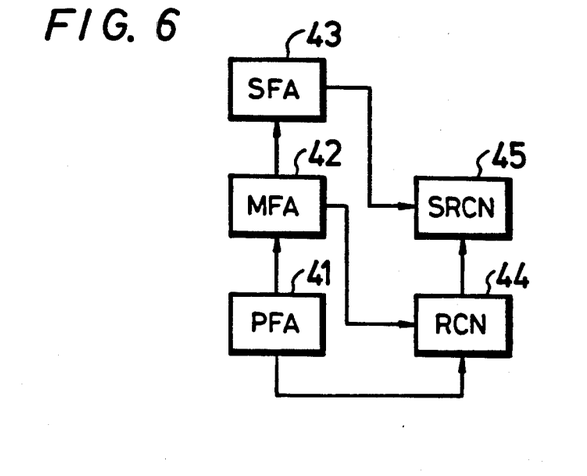
FIG. 6 is a circuit block diagram showing a main portion of an embodiment of the present invention.

FIG. 6 is a block diagram of the system controller 26 which is used to record the program identifying signal of the control signal. Reference numeral 41 designates a reproducing frame address register (hereinafter called "PFA") for storing a frame address written in the PCM-ID of a reproduced PCM signal, 42 a memory address register (hereinafter called "MFA") for storing an initially set frame address, 43 a start frame address register (hereinafter called "SFA") for storing a frame address at the start of an after-recording mode, 44 a rehearsal counter (hereinafter called "RCN") used during a rehearsal, and 45 a start rehearsal counter (hereinafter called "SRCN") used at the start of the after-recording operation. The frame address, as will be later described, is assigned a hexadecimal value from 0 [0000] to F [1111]. When the frame address changes from F [1111] to 0 [0000] in the PFA 41, the counted value of the RCN 44 is incremented by +1. On the other hand, when the frame address changes from 0 [0000] to F [1111], the counted value of the RCN 44 is decremented by −1. Incidentally, for another example, the counted value may be varied in a wider changing range in a manner that the counted value of the RCN 44 is incremented by +1 when the frame address changes from C[1100]∼F[1111] to C[0000]∼4[0100] and decremented by −1 when the frame address changes from 4[0100]∼0[0000] to F[1111]∼C[1100].

Next, an operation of recording the program start identifying signal of the control signal is explained with reference to FIGS. 7–11.

Figure 7:
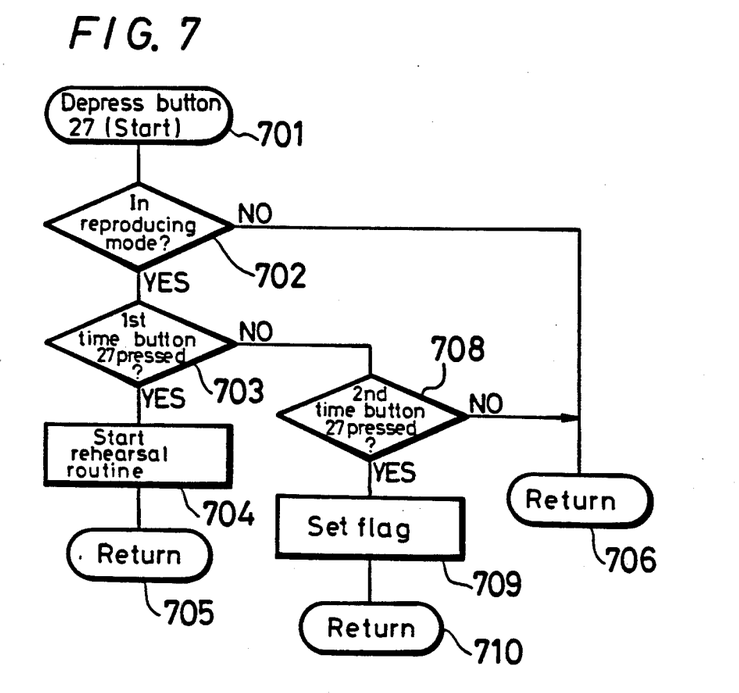
FIGS. 7-11 are respectively flowcharts for explaining operations of one embodiment of the present invention.

Referring first to FIG. 7, the program start identifying signal recording button 27 is depressed at step 701. It is determined by the system controller 27 at step 702 whether or not the apparatus is in the reproducing mode. If the answer to the step 702 is YES, the program proceeds to step 703 wherein the system controller 26 judges whether or not it is the first time that the button 27 is depressed. If it is judged that it is the first depression of the button 27, the program proceeds to step 704 at which a rehearsal routine shown in FIG. 8 is started and returns at step 705.

On the other hand, if the answer at step 702 is NO, the program proceeds to step 706 and is returned to the start of the program. If it is judged at step 703 that the depression of the button 27 is not the first time, the system controller 26 judges at step 708 whether or not it is the second time that the button 27 is depressed. If the answer is YES, a flag, indicative of the second time of depression, is set at step 709 and the program returns to its start at step 710. If the answer is NO at step 708, the program returns at step 706. The routine of FIG. 7 is repeated e.g. every 1 msec.

Figure 8:
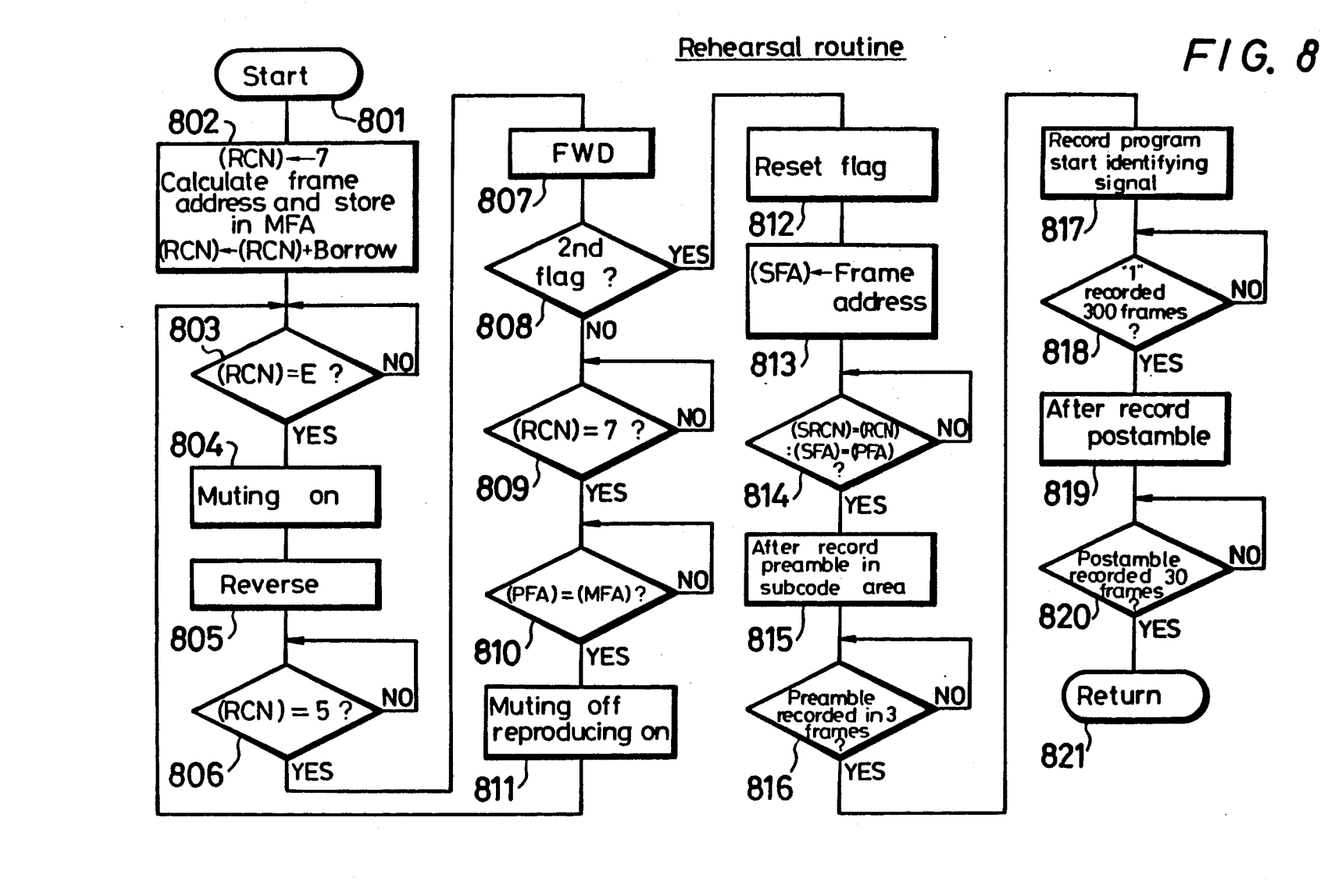

Referring next to FIG. 8, the rehearsal routine is shown. This is a sub-routine for rehearsal operation. The rehearsal operation is the repetition of the reproducing operation for three seconds before recording the start ID "1" in the position desired by the user. If the user depresses the program start identifying signal recording button 21 in the reproducing mode for recording the start ID signal "1" in the desired position, the reproducing operation is carried out repeatedly for three seconds. During this repetition of the reproducing operation, the repeat position is shifted by depressing the fast forward button 30 or the rewind button 31. Then if the user depresses the program start identifying signal recording button 27 again, the start ID signal "1" is actually recorded in the sub-code area for nine seconds.

The program enters the rehearsal routine at step 801. Then, at step 802, the RCN 44 in the system controller 26 is set to a value "7", and a frame address value calculated by subtracting "A" in hexadecimal, that is "10" in decimal, from the value stored in the PFA 41 is stored in the MFA 42. If a borrow is produced by the calculation, the borrow value is added to the value set in the RCN 44 and its content is incremented by 1, that is, the resulting value in the RCN 44 is "8". Thus, the after-recording mode is initially set, and the recording and/or reproducing apparatus is set in the reproducing mode by the system controller 26. In the reproducing operation, frame addresses written in the PCM-ID of PCM signals are sequentially stored in the PFA 41. The value stored in the RC 44 is incremented in response to the value in the PFA 41, to thereby keep the recording and/or reproducing apparatus in the reproducing operation.

At step 803, it is judged by the system controller 26 whether or not the value in the RCN 44 becomes "E" in hexadecimal, i.e. "14" in decimal. If the answer at the step 803 is NO or the value does not reach "14", the reproducing operation is continuously carried out for approximately 3 seconds for the value to reach "14". Next, at step 804, after the value arrives at "14", the system controller 26 carries out a muting operation for the error correcting circuit 20 and halts the reproducing operation. Then, at step 805 the apparatus is changed over to a reverse mode by the system controller 26 so that the tape is transported at a speed 3 times faster than the normal running speed. With the recording and/or reproducing apparatus maintained in the reverse mode, the frame address in the PCM-ID of the PCM signal is reproduced, and the counted value of the RCN 44 is decremented in response to value indicated by the PFA 41. Next, at step 806, the system controller 26 judges whether or not the value stored in the RCN 44 becomes "5". If the answer at step 806 is NO, the same operation as mentioned above is repeated until the value in the RCN 44 becomes "5". On the other hand, if the answer at step 806 is YES or the value arrives at "5", the program proceeds to step 807 wherein the system controller changes over the recording and/or reproducing apparatus to a forward mode.

At step 808 it is judged by the system controller 26 whether or not it is the second time that the operations between steps 803 and 807 are effected in the present loop or the flag is a second one. If the answer at step 808 is NO, the program proceeds to step 809 wherein it is detected by the system controller 26 whether or not the value stored in the RCN 44 is "7". If the answer at step 809 is NO or the value is not "7", the tape is advanced until the value in the RCN 44 becomes "7". If the value in the RCN 44 becomes "7", the program proceeds to step 810 wherein it is detected by the system controller 26 whether or not the frame address value stored in the PFA 41 coincides with the value previously stored in the MFA 42. If the answer at step 810 is NO, the tape is advanced until the value in the PFA 41 becomes the same value as that stored in the MFA 42. If this condition is established, the program proceeds to step 811 wherein the muting effected on the error correcting circuit 20 is released by the system controller 26, whereby the recording and/or reproducing apparatus is changed over to the reproducing mode, followed by the program jumping back to step 803. Thus, the rehearsal operation is carried out by repeating the reproducing operation for 3 seconds.

If the answer at step 808 is YES, that is, if it is judged that the flag is the second time flag, the program proceeds to step 812 wherein the flag indicative of the second operation is reset. Then, at step 813 the SFA 43 is set to a frame address calculated by subtracting 3 from the value stored in the MFA 42. If a borrow is produced by the subtraction, the borrow is added to the value in the RCN 44 and then stored in the SRCN 45. The preparation is thereby completed to place the recording and/or reproducing apparatus in the after-recording mode from a tape position 3 frames prior to the initially set frame address.

At step 814, it is judged by the system controller 26 whether or not the value in the SFA 43 equals the value in the RCN 44 and whether or not the value in the SFA 43 equals to the contents of the PFA 41. If one of the answers at step 814 is NO, the recording and/or reproducing apparatus is maintained in the forward mode until the two relationships are established. On the other hand, if the answers at step 814 are both YES, the program proceeds to step 815 to place the recording and/or reproducing apparatus in the after-recording mode wherein signals are recorded only in the sub-code area.

Next, at step 815 the preamble is after-recorded in the sub-code area. For example, "0" is recorded in a portion of the sub-code area assigned to the program start identifying signal of the control signal in the sub-code. Next, at step 816 it is judged by the system controller 26 whether or not the tape has been advanced a length corresponding to 3 frames (1 frame corresponds to 30 msec), that is, whether or not the preamble has been recorded in 3 frames. If the answer at step 816 is NO, the tape is continuously advanced until 3 frame portion thereof is advanced. Then, if it is judged that the preamble is recorded in 3 frames, the program proceeds to step 817 wherein "1" is recorded in a portion of the sub-code area for the program start identifying signal.

Next, at step 818 it is judged by the system controller 26 whether or not the tape has been advanced a length corresponding to 300 frames, that is, whether or not the "1" has been recorded in the program start identifying signal portion of 300 frames. If the answer at step 818 is NO, the tape is continuously advanced by 300 frame portions. Then, if it is judged that "1" is recorded in 300 frames, the program proceeds to step 819.

At step 819, the postamble is after-recorded. For example, "0" is recorded in a portion of the sub-code area assigned to the program start identifying signal. Next, at step 820 it is judged by the system controller 26 whether or not the tape has been advanced a length corresponding to 30 frames, that is, whether or not the postamble has been recorded in 30 frames. If the answer at step 820 is NO, the tape is continuously advanced by 30 frame portions. Then, if it is judged that the postamble is recorded in 30 frames, the program proceeds to step 821 to return to the main routine, that is, to step 704 of the program of FIG. 7. Thus, "1" is recorded in the program start identifying signal portion of each frame for approximately 9 seconds, that is, in 300 frames.

If it is desired that the starting point of the rehearsal operation is changed, the frame address value initially set at step 802 of FIG. 8 is increased or decreased by depressing the fast forward button 30 and rewinding button 31. If a carry or borrow is produced in this operation, the value stored in the RCN 44 is also increased or decreased. For example, referring to FIG. 9, the fast forward button 30 is depressed at step 901, and it is judged, at step 902, by the system controller 26 whether or not the recording and/or reproducing apparatus is in the rehearsal operation. If the answer at step 902 is YES, the program proceeds to step 903 wherein a hexadecimal value "A" is added to the value stored in the MFA 42 to change the value previously stored therein. If a carry is produced by this addition, the value in the RCN 44 is changed by subtracting the carry from the value of the RCN 44. In other words, a correction is carried out to deviate the reference point set at step 802 of FIG. 8 by a portion corresponding to 0.3 seconds in the forward direction. Then, the program proceeds to step 904 to return to the main routine.

Figure 9:
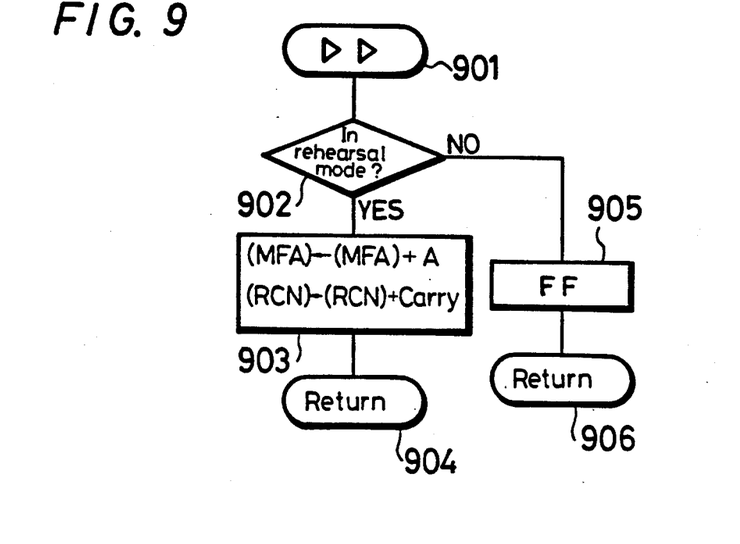

If it is judged at step 902 that the recording and/or reproducing apparatus is not in the rehearsal mode, the recording and/or reproducing apparatus is changed over to the ordinary fast forward (FF) mode by the system controller 26 at step 905. Then, the program proceeds to step 906 to return to the main routine.

Figures 10, 11:
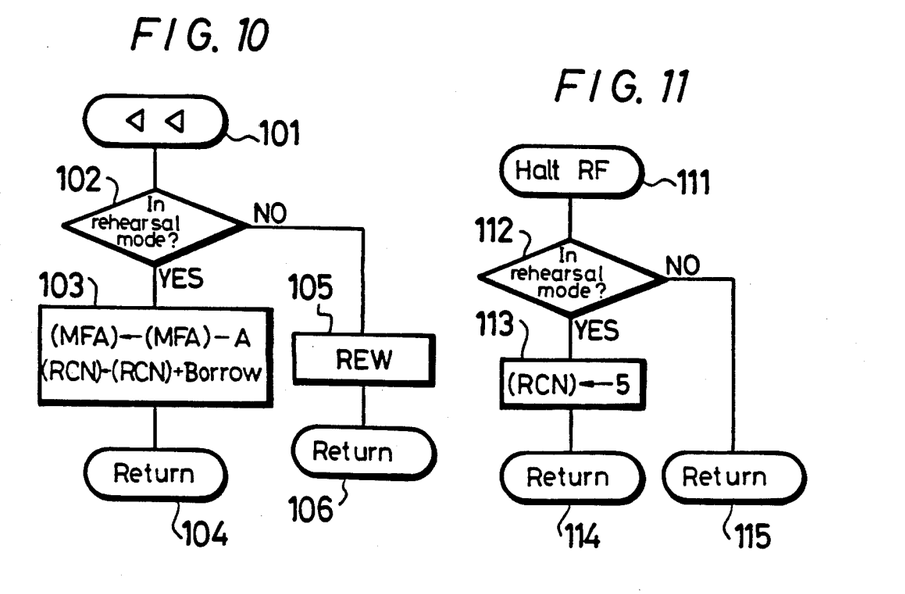

Referring next to FIG. 10, if the rewinding button 31 is depressed at step 101, it is judged at step 102 by the system controller 26 whether or not the recording and/or reproducing apparatus is in the rehearsal operation. If the answer at step 102 is YES, the program proceeds to step 103 wherein a hexadecimal value "A" is subtracted from the value stored in the MFA 42 to change the value initially stored therein. If a borrow is produced by this subtraction, the value in the RCN 44 is added with the borrow to change the value of the RCN 44. In other words, a correction is carried out to deviate the reference point set at step 802 of FIG. 8 by a portion corresponding to 0.3 seconds in the backward direction. Then, the program proceeds to step 104 to return to the main routine.

If it is judged at step 102 that the recording and/or reproducing apparatus is not in the rehearsal mode, the recording and/or reproducing apparatus is changed over to the ordinary rewinding (REW) mode by the system controller 26 at step 105. Then, the program proceeds to step 106 to return to the main routine.

As described above, although the recording and/or reproducing apparatus reads frame addresses written in the PCM-ID of PCM signals in the rehearsal operation during the rehearsal mode, the rehearsal operation cannot be carried out in a portion in which signals are not recorded, because no signals can be read. To cope with this problem, the present embodiment forcibly changes the value stored in the RCN 44 when the recording and/or reproducing apparatus begins to read a non-recorded portion of a tape, whereby the rehearsal operation can be carried out even in non-recorded portions. This operation is explained with reference to FIG. 11. First, if an RF signal supplied from the envelope detecting circuit 32 to the system controller 26 is halted at step 111, it is judged by the system controller 26 at step 112 whether or not the recording and/or reproducing apparatus is in the rehearsal mode. If the answer at step 112 is YES, the program proceeds to step 113 wherein the value in the RCN 44 is forced to be set to "5". Then, the program is returned at step 114 to carry out the operation from the step 801 of FIG. 8. If the answer at step 112 is NO, the program proceeds to step 115 to return to the main program.

Next, the erasing operations of the program start identifying signal and skip identifying signal will be explained with reference to the flowchart of FIG. 12. The erasing operation of the program start identifying signal and that of the skip identifying signal are substantially the same so that these two operations are explained at the same time.

Figure 12:
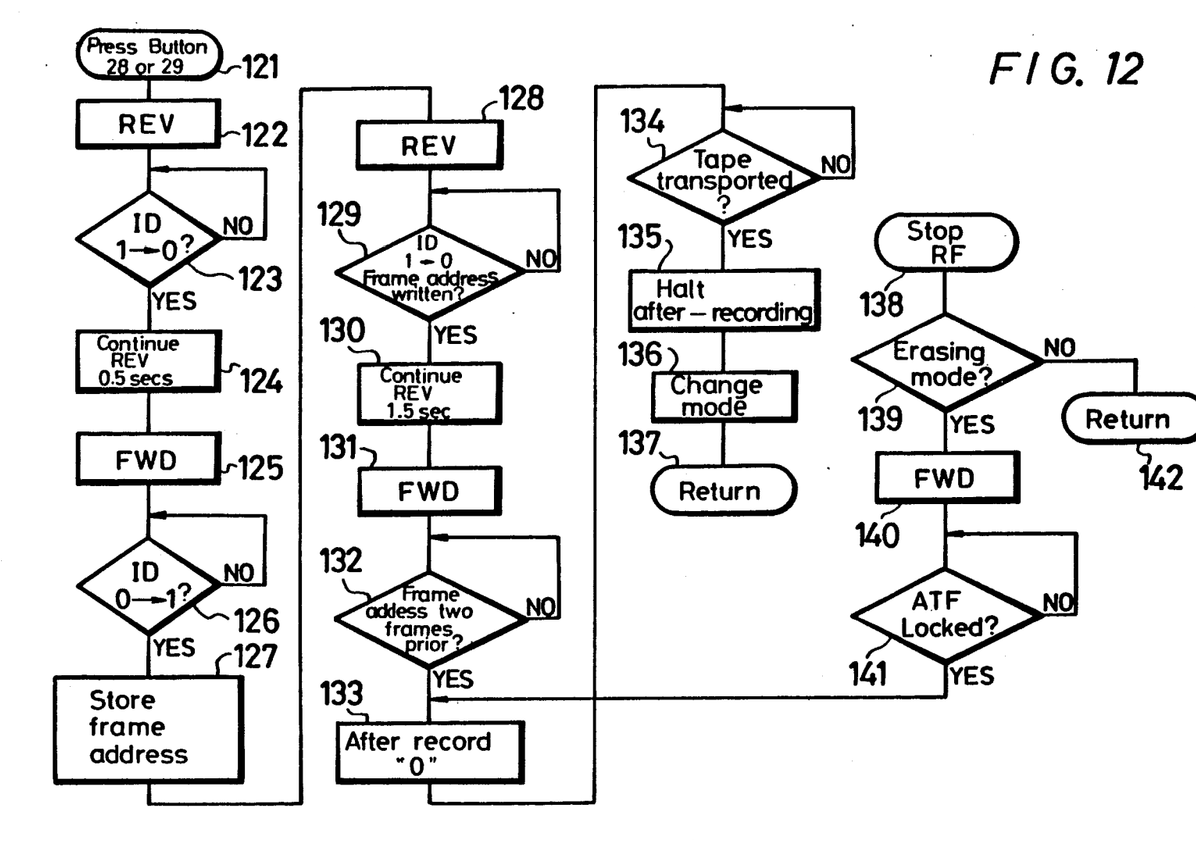
FIG. 12 is a flowchart for explaining operations of another embodiment of the present invention.

In FIG. 12, the program start identifying signal erasing button 28 or the skip identifying signal erasing button 29 is depressed at step 121 to erase a first identifying signal (ID), that is, "0" is recorded as the identifying signal. The recording and/or reproducing apparatus is placed in the reverse mode at a speed 3 times or 16 times higher than the normal speed at step 122 to transport the tape 14 in the reverse direction and search for the identifying signal. At step 123 it is checked through the sub-code microcomputer 25 whether or not the identifying signal changes from "1" to "0" in the system controller 26. If the change is not detected, the apparatus is maintained in the reverse mode until the change is detected. When the change is detected, the recording and/or reproducing apparatus is maintained in the reverse mode for further 0.5 seconds, at step 124, so as to confirm the initialization of the system, such as the ATF is locked and so on. Then, the recording and/or reproducing apparatus is placed in the forward mode at step 125.

At step 126 it is checked by the system controller 26 whether or not the identifying signal changes from "0" to "1". If the change is not detected, the recording and/or reproducing apparatus is maintained in the forward mode until the change is detected. If the change is detected, the program proceeds to step 127 wherein the frame address value written in the PCM-ID of the PCM signal at the time of the change is stored in the system controller 26. If the skip identifying signal is to be erased, in addition to the frame address, other sub-codes such as 1 frame portion of the program start identifying signal, the program number, the time code and so on are also stored in the system controller 26.

The recording and/or reproducing apparatus is placed in the reverse mode at step 128, wherein the tape is rewound at the normal speed while checking the previously stored frame address. It is judged at step 129 by the system controller 26 whether or not the identifying signal has changed from "1" to "0" and whether or not the frame address is written in the PCM-ID. If one of the answers at step 129 is NO, the apparatus is maintained in the reverse mode. If both answers are YES, the program proceeds to step 130 wherein the recording and/or reproducing apparatus is maintained in the reverse mode for a further 1.5 seconds to confirm the initialization of the system. Then, the apparatus is placed in the forward mode at step 131 to transport the tape 14 in the forward direction, while reading the frame addresses. It is checked at step 132 by the system controller 26 whether or not the address presently read shows a frame address 2 frames prior to the previously stored frame address. If the answer at step 132 is NO, the forward operation is continued until the read frame address is 2 frames prior to the previously stored frame address. If the answer is YES, the program proceeds to step 133.

At step 133, "0" is after-recorded in the sub-code area, in which control signals are recorded, for a predetermined time period. To be specific, if the program start identifying signal is to be erased, "0" is after-recorded in 2 frames of the preamble, 300 frames of the program start identifying signal and 30 frames of the postamble, that is, totally in 332 frames. When the skip identifying signal is to be erased, "0" is after-recorded in 2 frames of preamble 30 frames of the skip identifying signal and 3 frames of the postamble, that is, totally in 35 frames. Further, when the skip identifying signal is concerned, other identifying signals are set to previously recorded values while the time code is incremented in an insertion manner.

Next, at step 134 it is judged by the system controller 26 whether or not the tape 14 is transported by 332 frames in the case of the program start identifying signal or 35 frames in the case of the skip identifying signal. If the answer at step 134 is NO, the after-recording operation is continued until the tape 14 is transported by 332 frames, as the case may be. If the answer is YES, the after-recording operation is halted at step 135. Then, the apparatus is placed in an arbitrary mode such as stop, forward and so on at step 136, followed by the program returning to the main routine at step 137.

Thus, the value "1" recorded in the program start identifying signal or skip identifying signal portion is written over by "0", that is, the program start identifying signal or skip identifying signal is erased. The above-mentioned preamble and postamble are provided to prevent signals in front of and behind the identifying signals from remaining unerased.

As described above, the recording and/or reproducing apparatus reads frame addresses written in the PCM-ID of PCM signals during the erasing operation. However, the erasing operation cannot be carried out for the portion in which signals are not recorded. The present embodiment attends to this problem by immediately changing over the recording and/or reproducing apparatus to the forward mode when a non-recorded portion arrives, whereby the erasing operation can be continued even in non-recorded portions. This operation is explained as follows:

First, if an RF signal supplied from the envelope detecting circuit 32 to the system controller 26 is stopped at step 138, it is judged by the system controller 26 at step 139 whether or not the recording and/or reproducing apparatus is in the erasing mode. If the answer at the step 139 is YES, the recording and/or reproducing apparatus is immediately changed over to the forward mode at step 140. It is judged at step 141 by the system controller 26 whether or not the ATF is locked. If the answer at step 141 is NO, the recording and/or reproducing apparatus is maintained in the forward mode until the ATF is locked. If the answer at step 141 is YES, the program jumps back to step 133 to repeat the same operations as described above. If the answer at step 139 is NO, that is, if the erasing operation of the identifying signal is not carried out, the program proceeds to step 142 to return to the main routine.

As described above, according to the present invention, the start point from which a control signal, such as the program start identifying signal, is recorded in the sub-code area is set by the use of the address signal written in the PCM area so that the positional information of the recording medium can be exactly detected and thereby it is assured that the control signal can be recorded in a desired position.

Further, according to the present invention, the identifying signal recorded in the tape is detected, the address written in the PCM area at the time of detection of the identifying signal is stored, and the contents of the identifying signal is changed and recorded again on the basis of the address signal, so that a desired identifying signal can be automatically and exactly erased without any of the identifying signal desired to be erased remaining unerased.

The above description is given on a single preferred embodiment of the invention but it will be apparent that many modifications and variations could be effected by one skilled in the art without departing from the spirits or scope of the novel concepts of the invention so that the scope of the invention should be determined by the appended claims only.

We claim as our invention:

1. An apparatus for recording and/or reproducing a control signal comprising:
   a recording medium, on which a main signal and an address is recorded in a main signal area and a control signal with respect to said main signal is recorded in a sub-signal area;
   means for reproducing said address recorded in said main signal area; and
   re-recording means for again recording the control signal in accordance with the reproduced address.

2. An apparatus for recording and/or reproducing a control signal as claimed in claim 1, further comprising:
   repeatedly reproducing means for repeatedly reproducing the main signal from the recording medium from a first position to a second position in accordance with the reproduced address; and
   correcting means for shifting the position of the recording medium relative to the repeatedly reproducing means.

3. An apparatus for recording and/or reproducing a control signal as claimed in claim 1, further comprising a rotary recording and/or reproducing head and wherein said main signal area and said sub-signal area are respectively formed on each of tracks oblique to the longitudinal direction of the recording medium by said rotary head and said address is recorded in said main signal area of each track.

4. An apparatus for recording and/or reproducing a control signal as claimed in claim 2, further comprising:
   means for determining the first position to be repeatedly reproduced; and
   means which counts changes in the reproduced address from the first position to be repeatedly reproduced and determines the second position to be repeatedly reproduced when the counted value reaches a predetermined value, wherein said correction means includes means for changing said predetermined address.

5. An apparatus for recording and/or reproducing a control signal as claimed in claim 1, wherein said control signal is a program start identifying signal indicative of the start of a program.

6. An apparatus for recording and/or reproducing a control signal as claimed in claim 1, further comprising:
   detecting means for detecting a position on said recording medium at which a predetermined identifying signal of said control signal is recorded; and
   means for storing a predetermined address on the basis of the reproduced address in response to said detecting means, wherein said re-recording means records the predetermined identifying signal of said control signal in accordance with the predetermined address so as to change contents of the predetermined identifying signal of said control signal.

7. An apparatus for recording and/or reproducing a control signal as claimed in claim 6, wherein said control signal is a program start identifying signal indicative of the start of a program.

8. An apparatus for recording and/or reproducing a control signal as claimed in claim 6, wherein said control signal is a skip identifying signal for skipping unnecessary information.

* * * * *